(12) United States Patent
Flood et al.

(10) Patent No.: US 6,421,172 B1
(45) Date of Patent: Jul. 16, 2002

(54) LONG BAND OPTICAL AMPLIFIER

(75) Inventors: Felton A. Flood, Somerset, NJ (US); Yongqian Liu, Painted Post; Richard G. Smart, Horseheads, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/472,459

(22) Filed: Dec. 27, 1999

(51) Int. Cl.[7] .................................................. H01S 3/00
(52) U.S. Cl. .............................. 359/341.41; 359/337.1; 359/337.4
(58) Field of Search ..................... 359/337.4, 341.31, 359/341.33, 341.5

(56) References Cited

U.S. PATENT DOCUMENTS

| 5,050,949 A | * | 9/1991 | DiGiovanni et al. | 359/341 |
| 5,742,427 A | * | 4/1998 | Kakui et al. | 359/341 |
| 6,201,637 B1 | * | 3/2001 | Nilsson et al. | 359/341 |

FOREIGN PATENT DOCUMENTS

| EP | 0845840 | 6/1988 |
| EP | 0463771 | 1/1992 |
| EP | 0779687 | 6/1997 |
| EP | 0932228 | 7/1999 |

OTHER PUBLICATIONS

Cordina et al., "Ultra Low noise long wavelength EDFA with 3.6 db external noise figure", OFC '99, Feb. 21–26, 1999, pp. 13–15.*

Lee et al., "Enhancement of Power Conversion Efficiency for an L–band EDFA with a Secondary Pumping Effect in the Unpumped EDF Section", IEEE Photonics Technology Letters, vol. 11, No. 1, Jan. 1999, pp. 42–44.*

Kean et al., "Pump induced inhomogeneity of gain spectra in conventional and extended–band EDFAs", OFC'99, Feb. 21–26, 1999, pp. 10–12.*

Ono et al., "Gain–Flattened Er3+ Doped Filter Amplifier for a WDM Signal in the 1.57–1.60 micrometer Wavelength region", IEEE Photonics Technology Letters, vol. 9, No. 5, May 1997.*

Wysocki et al., "Broad–Band Erbium–Doped Fiber Amplifier Flattened Beyond 40 nm Using Long–Period Grating Filter", IEEE Photonics Technology Letters, vol. 9, No. 10, Oct. 1997.*

Espindola, R.P. et al., Low noise, high gain, high conversion efficiency L–band EDFA, Technical Digest of the 10th Optical Amplifier and Their Application, Nara, Japan (1999).

* cited by examiner

Primary Examiner—Thomas H. Tarcza
Assistant Examiner—Deandra M. Hughes
(74) Attorney, Agent, or Firm—Svetlana Short

(57) ABSTRACT

The optical amplifier includes a first gain medium having an optical host that contains a rare earth dopant and a first pump that supplies optical energy at a first wavelength into this first gain medium. The first pump operates at a pump wavelength that has a lower inversion saturation than the highest wavelength of absorption of the first gain medium. The optical amplifier further comprises a second gain medium operatively coupled to the first gain medium and a second pump that supplies optical energy into the second gain medium.

21 Claims, 6 Drawing Sheets

PDFA (Praseudynium-doped fiber amplifiers)

NDFA (Neudymium-doped fiber amplifiers)

LONG BAND OPTICAL AMPLIFIER

FIELD OF THE INVENTION

The present invention relates generally to long band optical amplifiers. More particularly, the invention relates to a long band optical amplifier employing a rare earth doped fiber and an improved dual pumping technique.

BACKGROUND OF THE INVENTION

Optical amplifiers increase the amplitude of an optical wave through a process known as stimulated emission in which a photon, supplied as the input signal, excites electrons to a higher energy level within an optical material, which then undergo a transition to a lower energy level. In the process, the material emits a coherent photon with the same frequency, direction and polarization as the initial photon. These two photons can, in turn, serve to stimulate the emission of two additional photons coherently, and so forth. The result is coherent light amplification. Stimulated emission occurs when the photon energy is nearly equal to the atomic transition energy difference. For this reason, the process produces amplification in one or more bands of frequencies determined by the atomic line width.

While there are a number of different optical amplifier configurations in use today, the optical fiber amplifiers are quite popular, particularly for optical communications applications. The optical fiber amplifier typically includes an optical material such as glass, combined with a rare earth dopant such as such as Erbium and configured as an optical waveguide. Rare-earth-doped silica fibers are popular today in part because they offer the advantages of single-mode guided wave optics. Optical fiber amplifiers made of such fibers can be made to operate over a broad range of wavelengths, dictated by the atomic properties of the host and rare earth dopant. For example, Erbium doped fiber amplifiers (EDFAs) operate at two signal bands of the fiber transmission window. These signal bands are a conventional-band (C-band) with wavelength range from approximately 1528 nm to approximately 1565 nm and a long band (L-band) with wavelength range from approximately 1568 nm up to approximately 1610 nm.

In a typical optical amplifier fabricated using Erbium doped silica fiber, electrons are excited (pumped) from the ground state ($^4I_{15/2}$) to the metastable state ($I_{13/2}$) by either a pump at 980 nm wavelength or 1480 nm wavelength. In the case of 980 nm pump, the electrons are first pumped to the excited state ($^4I_{11/2}$) and then non-radiactively decay into the metastable state ($^4I_{13/2}$) (See FIG. 11). In the case of 1480 nm pump the electrons are directly pumped into $^4I_{13/2}$ state. The amplification occurs when the electrons in $I_{13/2}$ state decay into the ground state by stimulated emission. After the electrons decay to the ground energy level $^4I_{15/2}$, they can be re-pumped to the excited energy level $^4I_{11/2}$ where they can take part in further stimulated emission processes.

Erbium doped fiber amplifiers (EDFAs) are typically made out of multiple stages of coiled Er-doped fibers. An example of such Erbium doped fiber amplifier is shown in FIG. 2. The most critical parameters on the performance of EDFAs are noise figure (NF) and gain G. The noise figure, NF, measured in dBs is defined as 10 times $Log_{10}$ of the ratio of the signal (S) to noise (N) ratio at the input of the amplifier to that at the output of the amplifier. That is, NF=10×$Log_{10}$(S/N) in/ (SIN) out. The gain, G, is defined as the ratio of signal output power to signal input power. In multistage amplifiers the noise figure NF is largely determined by the gain G in the front end of the amplifier. Thus, the higher the gain G of the first coil of the EDFA, the lower NF. Another measure of EDFA performance is the power efficiency, which is defined as the ratio between the numbers of photons amplified to the numbers of photons extracted from the pump. Since the performance of the communication system is determined by the noise performance of the amplifiers in the system, signal power of the amplifiers, and fiber transmission properties, optical communication systems require that the EDFAs have the lowest possible noise figure (NF), and provide the highest possible gain, (G).

FIG. 3 illustrates the absorption spectrum of the Erbium doped fiber (EDF). This figure shows that a strong absorption peak is present in the 980 nm-pumping band. Because of the strong absorption at the 980 nm wavelength, some long-band EDFAs use a 980 nm pump in conjunction with a first EDF coil. The use of the 980 nm wavelength pump introduces high inversion at the front end of the optical amplifier, thus resulting in a low noise figure (See FIG. 2). The 980 nm pump provides less efficient power conversion relative to 1480 nm pump and is relatively difficult to build. Therefore, a to 980 nm pump is expensive. However, it appears to be a common belief that the use of a less efficient, more expensive 980 nm pump (as the first pump in the L-band amplifier) is needed in order to provide low noise and thus, high signal to noise ratio so that a cleaner signal is provided to the second EDF coil for further amplification.

In order to extract maximum power, the second stage pump (i.e., the pump that is coupled to the second EDF coil) is typically a more efficient, less expensive to manufacture, 1480 nm wavelength pump (see FIG. 2). It is known that this second pump will improve the efficiency of the multiple stage EDF amplifier without introducing too much noise into the system.

It is desirable to provide low noise L-band optical amplifiers that are also more efficient than prior art long band optical amplifiers.

SUMMARY OF THE INVENTION

According to one aspect of the present invention an optical amplifier comprises: a first gain medium having an optical host that contains a rare earth dopant and a first pump that supplies optical energy at a first wavelength into this first gain medium. The first pump operates at a pump wavelength that has a lower inversion saturation than the highest wavelength of absorption of the first gain medium. The optical amplifier further comprises a second gain medium operatively coupled to the first gain medium and a second pump that supplies optical energy into the second gain medium.

According to another aspect of the invention, the optical amplifier comprises an optical waveguide having an optical host that contains a rare earth dopant. The host and dopant define a ground energy state. The amplifier further includes a first pump optically coupled to the waveguide. This first pump supplies optical energy into the waveguide at a first wavelength. The first pump establishes a metastable energy state above the ground energy state. An input, coupled to the optical waveguide, introduces an optical signal to be amplified, where amplification is produced by stimulated emission of photons from the metastable energy state. This establishes a termination energy state below the first metastable energy state and above the ground energy state. The optical amplifier further comprises a second pump optically coupled to a second waveguide. The second pump supplies optical energy to the second waveguide at a wavelength that is the same as the wavelength of the first pump. The second pump repopulates the first metastable energy state by depopulating the termination energy state.

Embodiments of the present invention can provide an optical amplifier and a pumping technique that overcomes the difficulties associated with prior art L-band optical amplifiers. It is an advantage of this optical amplifier that it has low noise and high pumping efficiency.

For a more complete understanding of the invention, its objects and advantages, refer to the following specification and to the accompanying drawings. Additional features and advantages of the invention are set forth in the detailed description, which follows.

It should be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

DETAILED DESCRIPTION OF THE PREFERRED EMBODIMENTS

We have discovered that an improved dual pumping technique, (described in detail below) overcomes difficulty associated with prior art, and that the optical amplifier utilizing this dual pumping technique not only exhibits low noise level but also has approximately 40% higher efficiency than the prior art optical amplifiers. According to an embodiment of the present invention, this technique utilizes two pumps operating at the same wavelength. These pumps reduce the steady state population in the intermediate termination energy level while simultaneously repopulating the metastable energy level.

According to one embodiment of the invention, both pumps operate at a wavelength of 1480 nm and the optical amplifier utilizes multiple coils (stages) of Erbium doped fiber.

Figure 1:
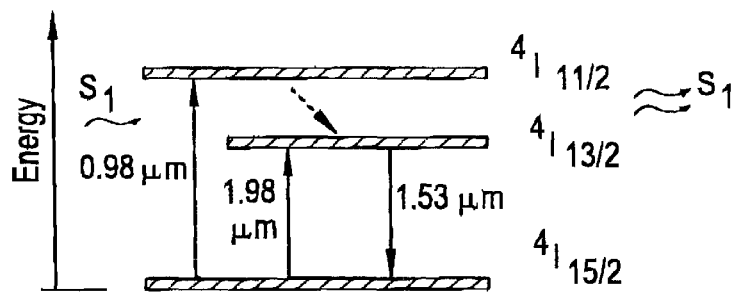
FIG. 1 is a energy diagram for an Erbium doped silica glass.
Figure 2:
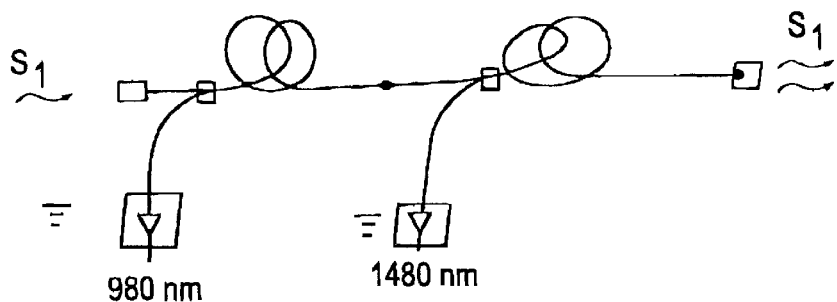
FIG. 2 is a schematic diagram illustrating a prior art two stage pumped optical fiber amplifier.
Figure 3:
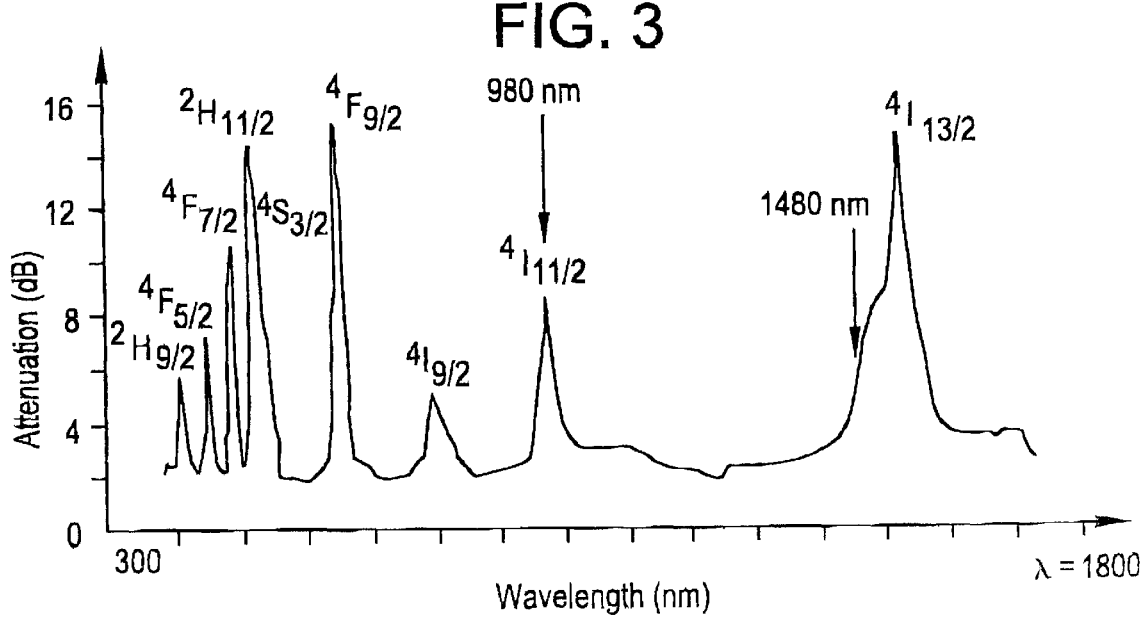
FIG. 3 is a plot of the absorption spectrum of the Erbium doped fiber.
Figure 4:
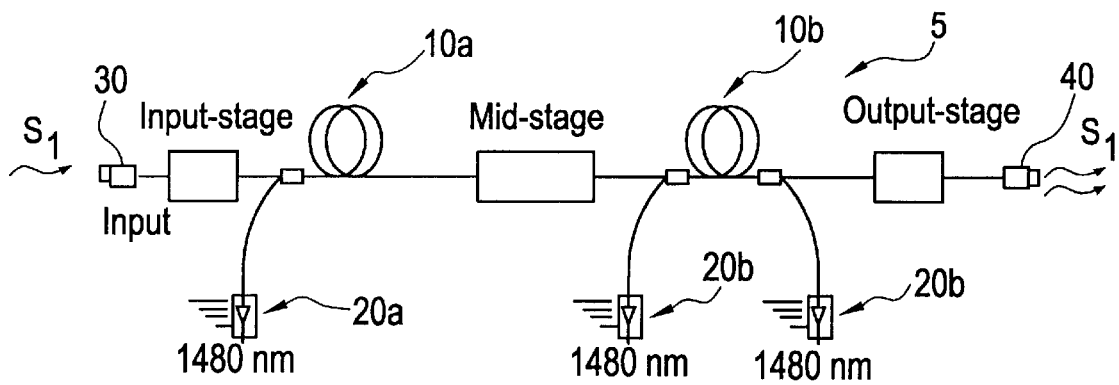
FIG. 4 is a schematic diagram of a two stage optical amplifier according to the first embodiment of the present invention.

FIG. 4 illustrates an exemplary embodiment of the optical amplifier 5 The preferred embodiment employs two optical waveguides 10a and 10b which may be, for example, an optical fiber having an inner core of a first optical material and an outer cladding of a different material. The materials used for the inner core and outer cladding have different indices of refraction so that optical energy reflects at the inner core-outer cladding interface thereby permitting the light to propagate through the waveguide.

Figure 5:
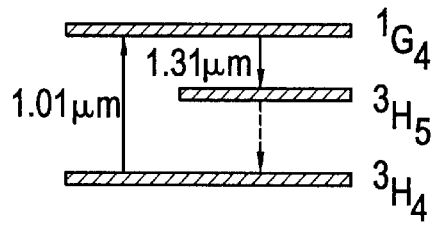
FIG. 5 is an energy diagram for a Praseodymium doped silica glass.
Figure 6:
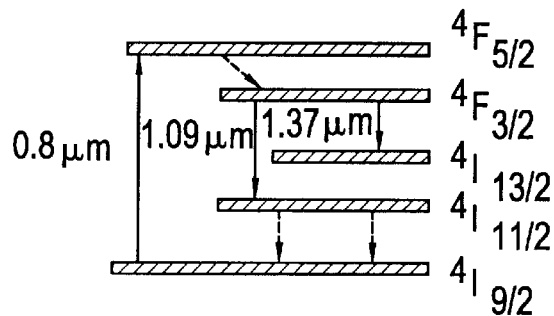
FIG. 6 is an energy diagram for a Neodymium doped silica glass.

As will be more fully explained below, the optical waveguide comprises a host material, preferably of glass, that contains a rare earth dopant. A variety of different optical materials and rare earth dopants may be used for this purpose. Although Erbium doped silica fiber is used as an example in this embodiment, the use of other example materials will be apparent to those having skill in the art. It is preferred that the rare earth dopants have a "three level" or a "four level" atomic energy structure. Some examples of other rare earth dopants are Praseodymium ($Pr^{3+}$) and Neodymium ($Nd^{3+}$). Some examples of other host materials are Fluorine (Fl) and Telluride (Tl). The energy level diagrams for these rare earth materials are shown in FIGS. 5 and 6. More specifically, FIG. 5 illustrates the energy levels of Praseodymium doped glass. A Praseodymium doped fiber amplifier (PDFA) may be pumped with a 1.01 nm pump and produces a signal in a 1.31 $\mu$m range. FIG. 6 illustrates energy levels of the Neodymium doped glass. A Neodymium doped fiber amplifier (NDFA) may be pumped with the 0.8 $\mu$m pump and produces a signal in the 1.37 $\mu$m range.

The optical amplifier 5 has a first pump 20a that serves as the primary pump. This pump is used to excite a population of rare earth ions within the optical material, raising them from their ground energy state to a metastable energy state. The metastable energy state is characterized by a comparatively long fluorescence lifetime, usually greater than 10 microseconds. In other words, ions raised to the metastable energy state remain in that state for a sufficient time enabling stimulated emission. The optical amplifier 5 illustrated in FIG. 4 includes an input port 30 into which an optical input signal S1 may be introduced. The input port 30 couples the input optical signal S1 into the first optical waveguide 10a (comprising a coiled active fiber) whereby amplification is produced by stimulated emission of photons from the metastable energy state. A second optical waveguide 10b, also comprising a coiled active fiber is arranged down stream of the first optical waveguide 10a. The optical waveguide 10b further amplifies optical signal provided by the waveguide 10a. The second optical waveguide 10b is coupled to the output port 40, from which the amplified optical signal exits the amplifier 5. The second pump 20b is coupled to the second optical waveguide 10b and serves to excite the population of rare earth atoms in the optical material of the waveguide 10b by raising them to the metastable energy state. The amplified optical signal exiting the first waveguide, 10a, is used as an input signal for the waveguide 10b and, as stated above, is further amplified by this waveguide, 10*b*. The amplifier 5 may include an input stage, a mid stage and an output stage. These stages may include components such as coupler(s), filter(s), isolator(s), attenuator(s), and/or gain flattener(s).

We have compared the performances of two stage Erbium doped silica fiber amplifiers (similar to the one of FIG. 4) with different first stage pumps 20*a*, each having to provide one of three different pump wavelengths. The pump power of the first stage pumps 10*a* is 140 mW. In each of these amplifiers, the second waveguide 10*b* is pumped by two 1480 nm pumps 20*b* to achieve good power conversion (i.e. high efficiencies). The pump power for the pumps 20*b* was varied between 130 mW and 185 mW. The total fiber length, i.e. the length of coiled fibers for both the first and second stage, was 130 meters. The results obtained from the simulated modeling of the amplifiers and from the actual measurements are discussed below. The analysis compares amplifiers that utilize a first pump 20*a* that provides either a 980 nm (case I), 1480 nm (case II) or 1510 nm (case III) pumping wavelength. The performance metrics are amplifier noise figure (NF) and second stage pump power (i.e. the pump power of the pump 20*b*).

Figure 7:
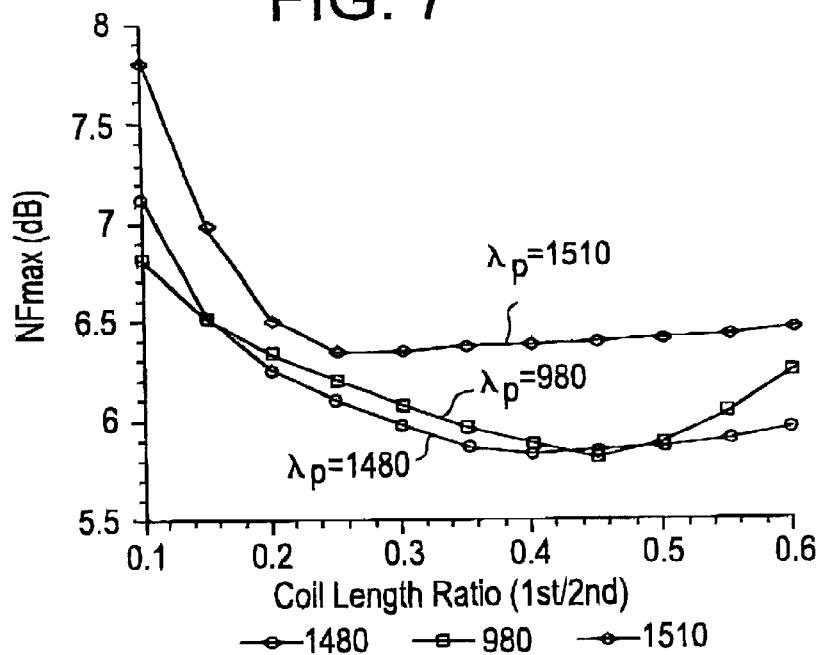
FIG. 7 is a family of curves plotting noise figure (NF) as a function of coil length ratios illustrating the resultant effect of varying the pump wavelength on NF.

FIG. 7 shows the maximum NF (noise figure) as a function of coil length ratio between the first stage (waveguide 10*a*) and second stage (waveguide 10*b*) for the three amplifier simulation models. It is clear from the simulation results that the maximum NF produced when the pump 20*a* operates at either 1480 nm or 980 nm wavelength is about the same. However, as can be seen from this figure, pumping with the 1510 nm pump 20*a* results in a significant degradation of NF. Pumping at different wavelengths on the first stage of the optical amplifier results in different front-end inversions due to the differences in absorption and emission coefficients at the pump wavelength of the pump 20*a*. For L-band amplifier, the front-end inversions for 980 nm and 1480 nm pumping are approximately the same due to a higher backward ASE (amplifier spontaneous emission) saturation in the 980 nm case. This was not taken into account in designs of the prior art L-band multiple stage optical amplifiers.

Figure 8:
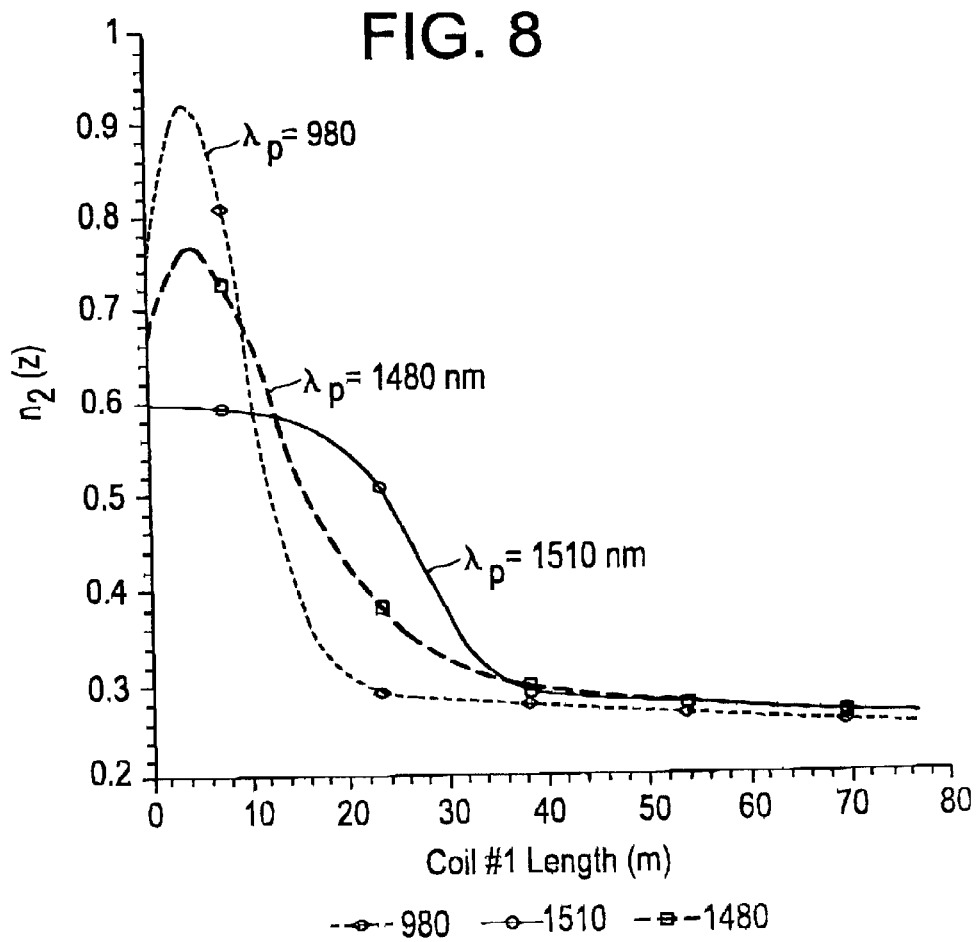
FIG. 8 illustrates the inversion profile of the first coil or EDFA for three different pumps.

FIG. 8 shows the inversion profile along the first coil of the Er-doped fiber using different forward pumping pumps 20*a* that operate at the same power (140 mW) but at different wavelengths. These wavelengths are 980 nm, 1480 nm, and 1510 nm. As stated above, the higher inversion at the front end of the optical amplifier results in lower noise figure. There is a clear saturation of the inversion at the front end of the amplifier when 980 nm pump is used. This is the result of a strong backward ASE (amplifier spontaneous emission) from the accumulation of the ASE at the front end of 43. the optical amplifier. As can be seen from this figure, the inversion saturation corresponding to the 1480 nm pump is significantly lower than that of a 980 nm pump, while the inversion profile corresponding to the 1510 nm pump shows no saturation of the front end inversion. Thus, we discovered that in the L-band amplifiers, the 1480 nm pump 20*a* has lower backward ASE than the 980 nm pump, and because of this, the front end inversion of the 1480 nm and 980 nm pumps is about the same. Therefore, surprisingly, these two pumps 20*a* (1480 nm and 980 nm) provide about the same noise figure NF. However, the 1480 nm pump provides significantly higher power for L-band operation than the 980 nm pump and is less expensive to manufacture than the 980 nm pump.

Figure 9:
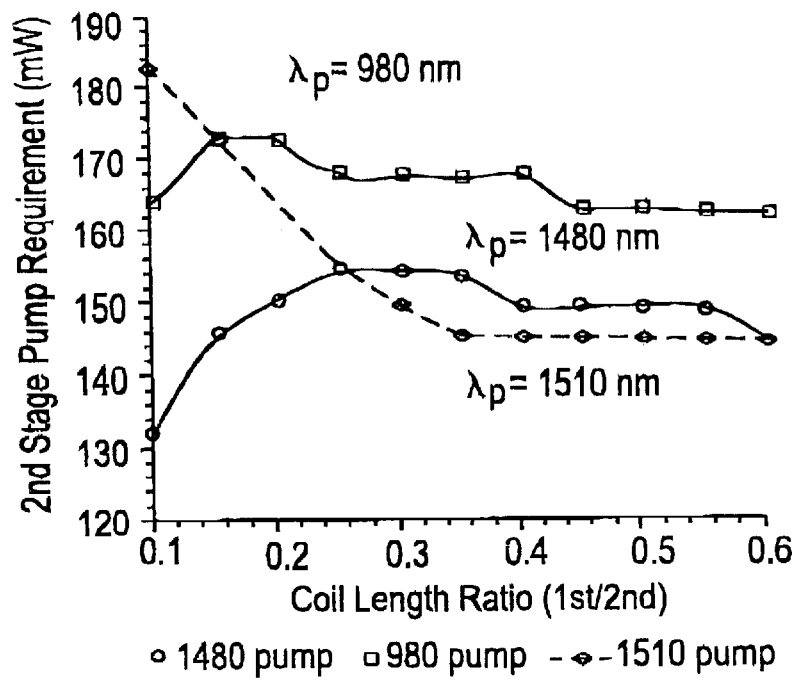
FIG. 9 illustrates second stage power requirements as a function of coil length ratio.

FIG. 9 illustrates the second stage pump power requirement as a function of coil length ratio between the first stage and second stages, when the first pump 20*a* operates at either 980 nm, 1480 nm, or 1510 nm wavelengths. The vertical axis represents pump power of the pump 20*b* in milliwats (mW). FIG. 9 illustrates that there is a reduction of pump power requirement (at coil ratios of about 0.16 or higher) when pumping at 1480 nm and 1510 nm compared to 980 nm pumping. Such reduction in pump power requirement will provide better pump margin for amplifier operation.

Figure 10:
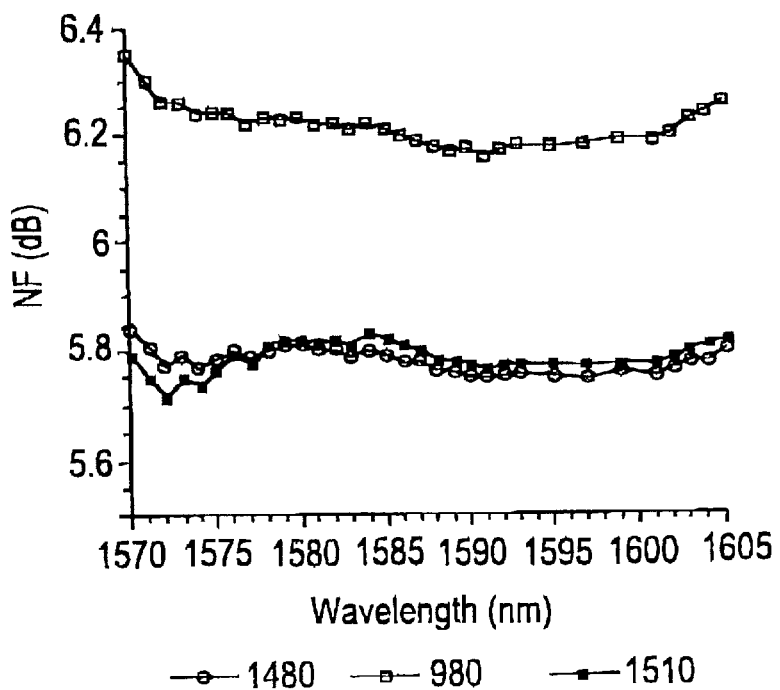
FIG. 10 is a family of curves plotting predicted NF spectra as a function of pump wavelength.

FIG. 10 shows the NF spectra (NF as a function of wavelength) from the above simulation. The NF spectrum represents the optimized coil ratio for each pumping configuration. The optimized coil ratio is about 0.3 and is determined by the ratio that results in the lowest noise figure (NF) for a given pump wavelength. FIG. 10 illustrates that pumping with the wavelengths of 980 nm and 1480 nm produce an equivalent noise figure performance, while a 1510 nm pumping configuration results in worse NF spectra for the L-band optical amplifiers.

Figure 11:
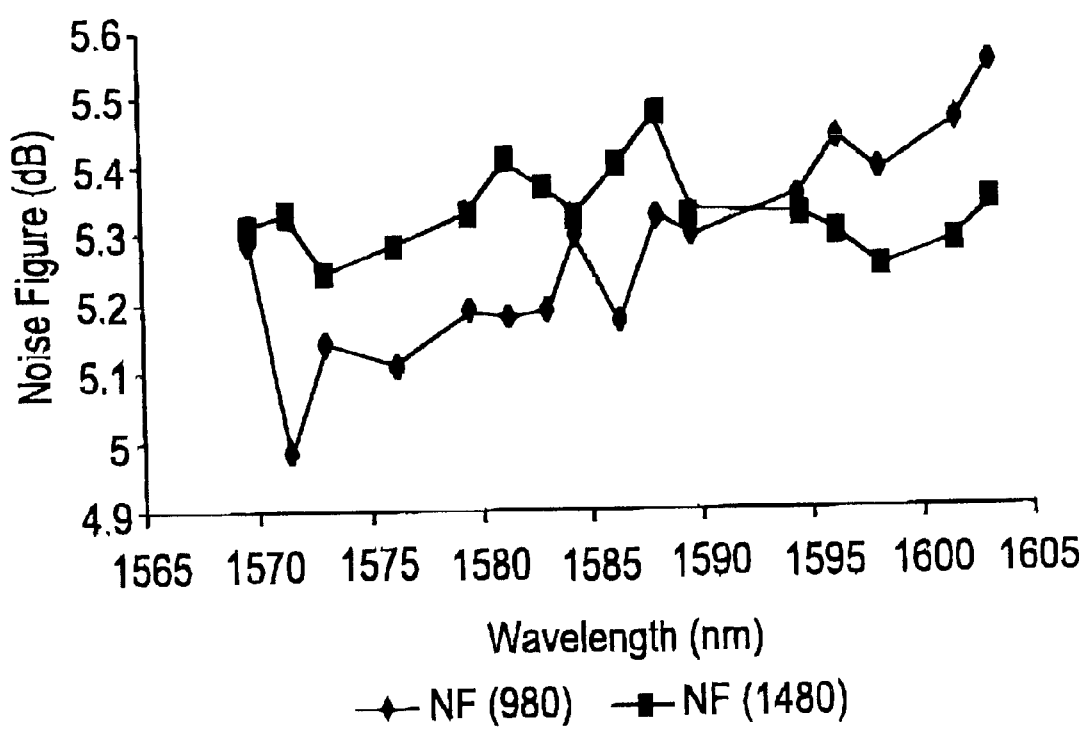
FIG. 11 is a family of curves plotting experimental data of the NF spectra as a function of pump wavelength.

Experimental results on the NF spectra for a two stage EDFA that utilizes a 1480 nm first pump 20*a* and a conventional 980 nm first pump 20*a* are shown in FIG. 11. The results are obtained from the identical optical amplifier that at first utilized a 980 nm first stage pump 20*a* and then utilized a 1480 nm first stage pump 20*a*. The first stage pumps 20*a* operated at a fixed coil ratio of a 40%. As expected, an all 1480 nm pumping configuration shows very good NF performance as compared to pumping configuration that utilizes a 980 nm first stage pump. This is consistent with the results form the simulation. With this configuration (the pump 20*a* providing laser beam at 980 nm wavelength) we have observed a reduction of the total pump power by about 35%.

Based on the experimental and theoretical results, we determined that dual pumping EDFA at the same wavelength (ex: 1480 nm pump for each staged the EDFA) resulted in improved pumping efficiency, while maintaining low noise level. More specifically, we demonstrated that 1480 nm pump provides sufficient front-end inversion to keep equivalent noise figure performance. Because of the higher power conversion efficiency, 1480 nm first stage pump 20*a* lowers the pump margin by more than 10%. From a product point of view, such superior optical performance plus more than 40% cost advantage makes all 1480 nm pumping configuration preferable in many application that utilize L-band EDFAs.

Figure 12:
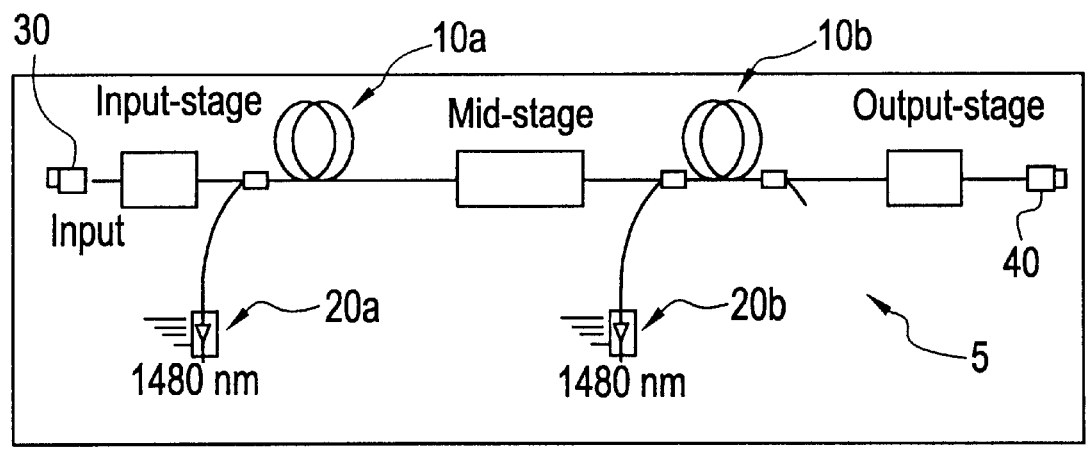
FIG. 12 is a schematic diagram illustrating the two stage pumped optical fiber amplifier of a first embodiment of the present invention.
Figure 13:
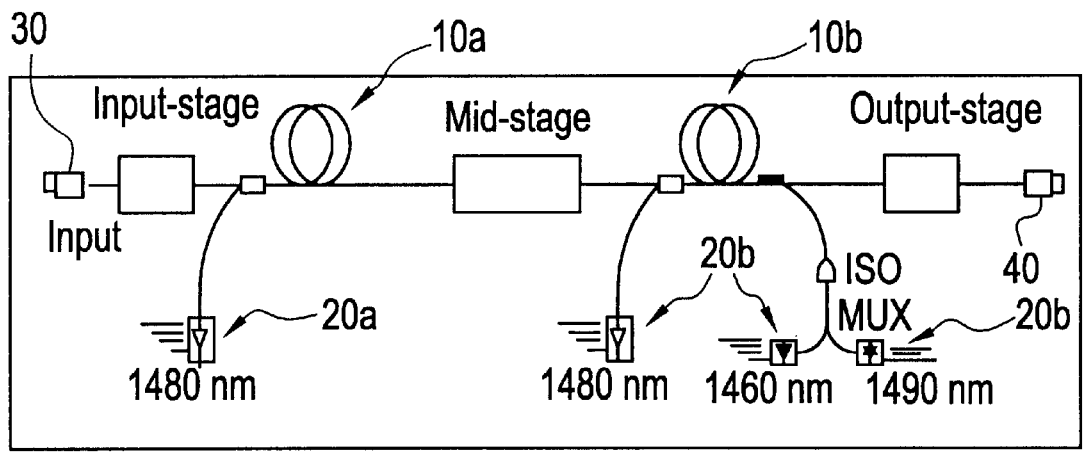
FIG. 13 is a schematic diagram illustrating the two stage pumped optical fiber amplifier of a second embodiment of the present invention.

FIGS. 12 and 13 illustrate other EDFA embodiments. The EDFA illustrated in FIG. 12 is similar to the EDFA illustrated in FIG. 4, but utilizes only one (forward pumping) pump 20*b*, coupled to the second EDF coil. The EDFA illustrated in FIG. 13 utilizes several different pumps 20*b*. The pumps 20*b* of this EDFA operate at different wavelengths, for pump multiplexing.

Thus, when taking into account backward ASE, noise figure and the power provided by the first pump 20*a*, we determined that with L-band EDFA it is preferable to utilize a 1480 nm first pump, 20*a*. The same principle should apply to other amplifiers (rare earth doped amplifiers with fibers having dopants other than Er and which operate at other wavelength bands). That is, in choosing the wavelength of choice of first pump 20*a*, one should preferably consider backward ASE and its effect on the noise figure NF and then chose the more efficient first pump that provides about the same noise figure. This pump will generally not be a 980 nm pump.

Accordingly, it will be apparent to those skilled in the art that various modifications and adaptations can be made to the present invention without departing from the spirit and scope of this invention. It is intended that the present invention cover the modifications and adaptations of this invention as defined by the appended claims and their equivalents.

What is claimed is:

1. An L-band optical amplifier comprising:
   (i) a first gain medium having an optical host that contains a rare earth dopant and operates at or below 76% inversion;
   (ii) a first pump that supplies optical energy at a first wavelength into said first gain medium, said first pump wavelength having lower inversion saturation than the highest wavelength of absorption of said first gain medium;
   (iii) a second gain medium operatively coupled to said first gain medium; and
   (iv) a second pump, said second pump supplying optical energy into said second gain medium.

2. The optical amplifier according to claim 1, wherein said second pump operates at a wavelength that is the same as said first wavelength of said first pump.

3. The optical amplifier according to claim 1, wherein said first wavelength is not 980 nm.

4. An L-band optical amplifier comprising:
   an optical waveguide having an optical host that contains a rare earth dopant and operates at or below 76% inversion, said host and dopant defining a ground energy state;
   a first pump that supplies optical energy into said waveguide at a first wavelength establishing a metastable energy state above said ground energy state, said first pump being optically coupled to said optical waveguide so that said optical waveguide operates below inversion level that would have been provided by a 980 nm pump, said first pump wavelength having lower inversion saturation than the highest wavelength of absorption of said optical waveguide;
   an input coupled to said optical waveguide, said input introducing an optical signal to be amplified, such that amplification is produced by stimulated emission of photons from said metastable energy state, thereby establishing a termination energy state below said first metastable energy state and above said ground energy state; and
   a second pump optically coupled to said waveguide, said second pump
      (i) supplying optical energy to said waveguide at a wavelength other than 980 nm, said wavelength being the same as said first wavelength of said first pump,
      (ii) and operates to repopulate said first metastable energy state by depopulating said termination energy state.

5. The optical amplifier of claim 4 wherein said optical waveguide is an Erbium doped glass fiber.

6. The optical amplifier according to claim 4 wherein said optical waveguide comprises at least two coils of Erbium doped silica fiber.

7. The optical amplifier according to claim 6 wherein said first pump is coupled to one of said coils and said second pump is coupled to another one of said coils.

8. The optical amplifier of claim 7 wherein said wavelength is about 1480 nanometers.

9. The optical amplifier according to claim 4 wherein said wavelength is about 1480 nanometers.

10. A L-band optical amplifier comprising:
    a first optical waveguide having an optical host that contains a rare earth dopant, said host and dopant defining a ground energy state;
    a first pump that supplies optical energy into said waveguide establishing a metastable energy state above said ground energy state, said first pump being optically coupled to said waveguide so that said first optical waveguide operates at or below 76% inversion, said first pump wavelength having lower inversion saturation than the highest wavelength of absorption of said first optical waveguide;
    an input coupled to said optical waveguide, said input introducing an optical signal to be amplified, such that amplification is produced by stimulated emission of photons from said metastable energy state, thereby establishing a termination energy state below said first metastable energy state and above said ground energy state;
    a second optical waveguide having an optical host that contains a rare earth dopant, said second optical waveguide being operatively connected to said first optical waveguide; and
    a second pump optically coupled to said second optical waveguide, said second pump supplying optical energy to said second optical waveguide at a wavelength that is the same as said wavelength of said first pump.

11. The optical amplifier of claim 10 further includes an output coupled to said second optical waveguide, said output providing an amplified optical signal.

12. An L-band optical amplifier comprising:
    (i) a first gain medium having an optical host that contains a rare earth dopant;
    (ii) a first pump that supplies optical energy at a first wavelength into said first gain medium so that said first gain medium operates at or below 76% inversion, said first pump wavelength having lower inversion saturation than the highest wavelength of absorption of said first gain medium;
    (iii) a second gain medium operatively coupled to said first gain medium; and
    (iv) a second pump supplying optical energy into said second gain medium, said second pump operating at a wavelength that is the same as said first wavelength of said first pump.

13. The optical amplifier according to claim 12, further containing a mid stage situated intermediate said first and said second gain medium said mid stage delivering an output signal from said first gain medium into said second gain medium, wherein said mid stage includes at least one of the following components: an isolator, a filter, a gain flattener, or an attenuator.

14. The optical amplifier according to claim 12, wherein said second pump is a forward pumping pump.

15. The optical amplifier of claim 13 further includes an output coupled to said second optical waveguide, said output providing an amplified optical signal.

16. An L-band optical amplifier comprising:
    (i) a first gain medium having an optical host that contains a rare earth dopant and operates at or below 76% inversion;
    (ii) a first pump that supplies optical energy at a first wavelength into said first gain medium; said first pump operating at a pump wavelength which is not the highest wavelength of absorption of said first gain medium so that said first pump wavelength having lower inversion saturation than the highest wavelength of absorption of said first gain medium and said optical waveguide operates below inversion level that would have been provided by a 980 nm pump;

(iii) a second gain medium operatively coupled to said first gain medium; and (iv) a second pump, said second pump supplying optical energy into said second gain medium.

17. The optical amplifier according to claim 16, wherein said second pump is a backward pumping pump.

18. The optical amplifier according to claim 16, further comprising at least one additional pump.

19. The optical amplifier according to claim 18 wherein said additional pump operates at a wavelength that is different form the wavelengths of said first and said second pumps.

20. The optical amplifier according to claim 15, wherein said second pump is a backward pumping pump.

21. The optical amplifier according to claim 15, further comprising at least one additional pump.

* * * * *